(12) United States Patent
Patterson

(10) Patent No.: US 8,388,440 B2
(45) Date of Patent: Mar. 5, 2013

(54) NETWORK ACCOUNT LINKING

(75) Inventor: Russell D. Patterson, Carlsbad, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1856 days.

(21) Appl. No.: 10/690,000

(22) Filed: Oct. 20, 2003

(65) Prior Publication Data

US 2005/0086126 A1    Apr. 21, 2005

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................................... 463/29
(58) Field of Classification Search ............. 705/26
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger et al. | |
| 5,128,671 A | 7/1992 | Thomas, Jr. | |
| 5,453,601 A | 9/1995 | Rosen | |
| 5,528,265 A | 6/1996 | Harrison | |
| 6,157,368 A | 12/2000 | Faeger | |
| 6,332,124 B1 | 12/2001 | Loeb et al. | |
| 6,375,572 B1 | 4/2002 | Masuyama | |
| 6,519,629 B2 | 2/2003 | Harvey et al. | |
| 6,758,746 B1* | 7/2004 | Hunter et al. ................. 463/9 |
| 2002/0085097 A1 | 7/2002 | Colmenarez et al. | |
| 2002/0143647 A1 | 10/2002 | Headings et al. | |
| 2002/0183040 A1 | 12/2002 | Lundstrom et al. | |
| 2003/0032480 A1* | 2/2003 | Keith ............................. 463/42 |
| 2003/0056093 A1* | 3/2003 | Huitema et al. ............. 713/156 |
| 2004/0031052 A1* | 2/2004 | Wannamaker et al. ......... 725/61 |
| 2004/0212589 A1 | 10/2004 | Hall et al. | |
| 2004/0243665 A1* | 12/2004 | Markki et al. ................ 709/201 |
| 2005/0044048 A1* | 2/2005 | Zmudzinski et al. .......... 705/59 |

OTHER PUBLICATIONS

Miller, JSOnline: Technology. Downloaded from http://www.jsonline.com/story/index.aspx?id=331597 pm Feb. 13, 2008. pp. 2-3.*

Ohmore, Maeno, Sakata, Fukuoka and Watabe, "Distributed Cooperative Control for Sharing Applications Based on Multiparty and Multimedia Desktop Conferencing System: MERMAID", IEEE; Jun 1992; pp. 538-546. Downloaded from IEEE Xplore on Mar. 23, 2010.*

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

*Primary Examiner* — Paul Danneman
(74) *Attorney, Agent, or Firm* — Frommer Lawrence & Haug LLP; William S. Frommer

(57) ABSTRACT

Methods and apparatus for managing and linking network accounts to share access privileges among accounts. In one implementation, a method of managing network accounts includes: linking a second account having general access to a first account having member access; and granting at least part of said member access to said second account while said second account is linked to said first account; wherein said first account has a corresponding subscription, said general access provides at least one privilege, and said member access provides two or more privileges that are not provided by said general access.

59 Claims, 5 Drawing Sheets

NETWORK ACCOUNT LINKING

BACKGROUND

One or more interconnected computer systems can provide an online environment for users to access resources available through the computer systems, such as web pages, multimedia data, and application software (e.g., games). The users can access the resources of the online environment using a local computer system with a network connection to one or more of the computer systems providing the online environment.

Online environments often use accounts to identify users and control access to the resources provided by the online environments. Each user typically has an account and the account indicates a level of access to the online resources. The provider of the online resource also often charges a fee for a subscription granting an account to a user. For an environment having different levels of access, a provider may charge higher fees for accounts with higher levels of access. Accordingly, from the provider's standpoint, it is desirable to encourage users to purchase more expensive subscriptions, and so the provider often attempts to make the accounts with higher levels of access more appealing to users.

SUMMARY

The present invention provides methods and apparatus for managing and linking network accounts to share access privileges among accounts. In one implementation, a method of managing network accounts includes: linking a second account having general access to a first account having member access; and granting at least part of said member access to said second account while said second account is linked to said first account; wherein said first account has a corresponding subscription, said general access provides at least one privilege, and said member access provides two or more privileges that are not provided by said general access.

In another implementation, a method of managing network accounts includes: creating an account having general access; receiving an upgrade request; confirming said account is permitted to be upgraded based on said account meeting one or more requirements for having member access; and upgrading said account to have member access.

In another implementation, a method of linking network accounts includes: creating a first account having general access; sending a link invitation indicating a second account having member access; receiving a link acceptance indicating said first account will be linked to said second account; sending a service request indicating a service having a minimum access requiring member access; and accessing said service.

In another implementation, a method of linking network accounts includes: creating a first account having member access; receiving a link invitation indicating a second account having general access; sending a link request indicating said second account is to be linked to said first account.

In another implementation, a computer program, stored on a tangible storage medium, for use in managing network accounts, includes executable instructions that cause a computer to: link a second account having general access to a first account having member access; and grant at least part of said member access to said second account while said second account is linked to said first account; wherein said first account has a corresponding subscription, said general access provides at least one privilege, and said member access provides two or more privileges that are not provided by said general access.

DETAILED DESCRIPTION

Figure 1:
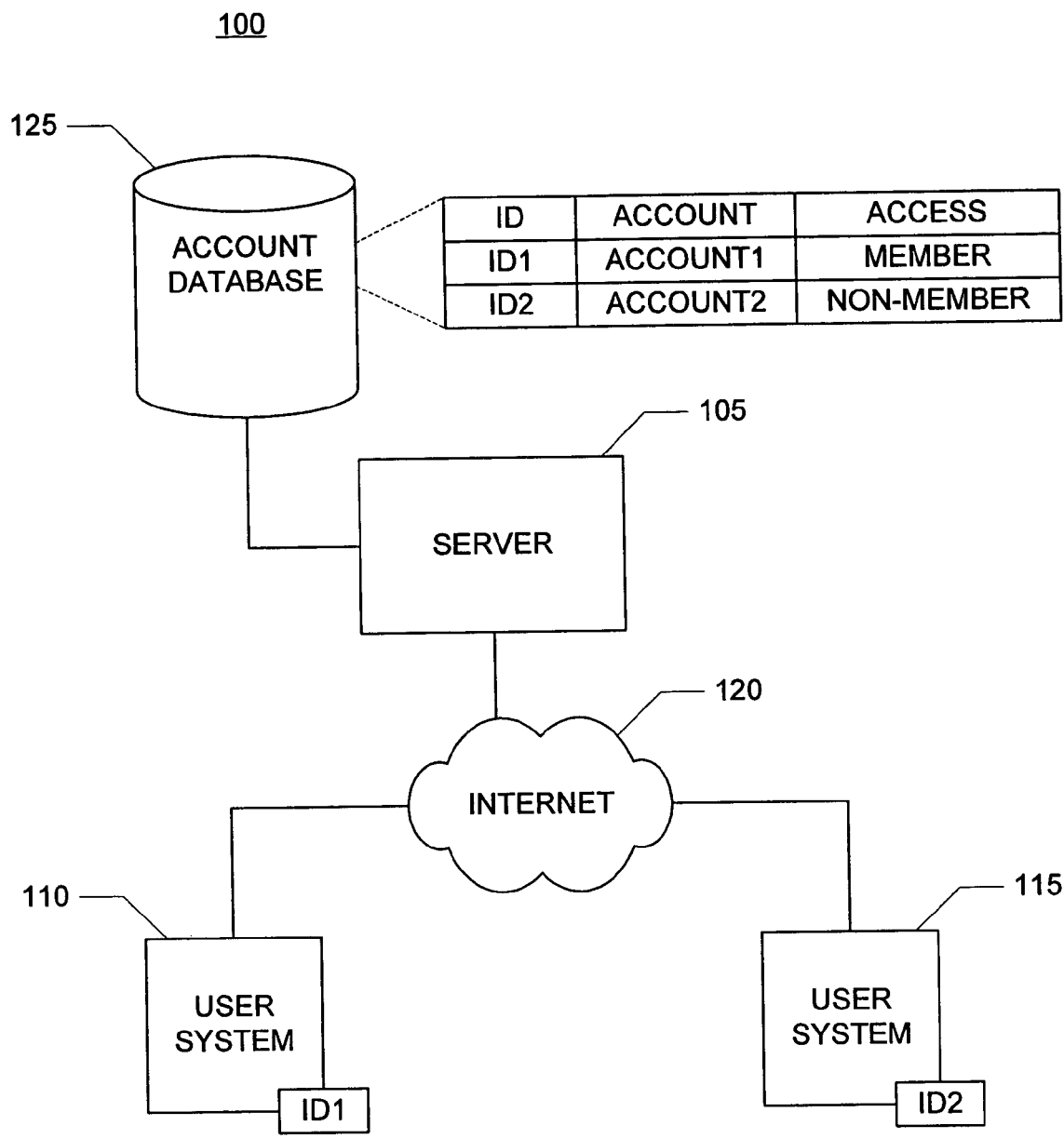
FIG. 1 shows a block diagram of one implementation of a network environment for linking network accounts.

The present invention provides methods and apparatus for managing and linking network accounts to share access privileges among accounts. In one implementation, an account having lower privileges is linked to an account having higher privileges. While the accounts are linked, both accounts can access the higher privileges. When the link is removed, the accounts return to their original levels of access.

An illustrative example of one implementation is described below. Additional variations are described after this example.

In one example of one implementation, a first user has purchased a subscription for an online gaming environment. The online gaming environment is supported by a collection of server computer systems (or one system) connected to the Internet. The first user has a game console with a network connection (e.g., a PlayStation 2™ offered by Sony Computer Entertainment Inc. of Japan) and can access the online gaming environment through the game console, such as to play an online game with other users. The first user's subscription permits the user to create a member account in the online environment and the first user has done so. The member account provides the first user with member access. Member access allows the first user to participate in ordinary online games in the online environment. Member access also allows the first user to access various resources in the online environment that are restricted to accounts having member access. For example, the first user can access a member chat room to chat with other users having member access and can participate in online game tournaments that are restricted to accounts having member access.

A second user also has a game console with a network connection and can access the online gaming environment through the game console. However, the second user does not have a subscription to the online gaming environment. The online environment permits users to create non-member accounts if they do not have subscriptions. A non-member account provides a user with general access, but does not provide member access. The second user creates a non-member account in the online environment. Because the second user has a non-member account and does not have member access, the second user cannot immediately participate in an ordinary online game.

The online gaming environment allows a non-member account to be linked to a member account. While the non-member account is linked to the member account, the non-member account temporarily is granted limited member access. In this example, the limited member access allows a non-member account to participate in the same game (ordinary or tournament) as the member account to which the non-member account is linked. The limited member access does not allow the non-member account to participate in the chat room for member accounts. (As described below, in other implementations, different types of access can be granted to linked accounts.)

The second user asks the first user to link accounts by sending a link invitation to the first user's account. The first user agrees and requests that the online environment link the accounts. Once the accounts are linked, both accounts have appropriate access to participate in an online game. The first user and the second user then start and enjoy an online game. When the game is over, the first user requests that the link be terminated (or the server automatically terminates the link) and the accounts are returned to their former states.

In this example, the first user has a benefit that the second user does not because the first user has a member account with member access. The first user can play in an online game without linking to another account. The second user needs to find another user that is willing to let the second user link to their account. Because of this type of benefit, the member account will be desirable. In addition, because users with non-member accounts will seek out users with member accounts to be able to play in online games, the users with member accounts will be in demand. As a result, the users with member accounts will be popular and attract attention in the online environment. Again, the member accounts will be desirable. The online gaming environment provider can leverage this desirability for benefit through increased subscription revenue and increased use (e.g., leading to increased advertising revenue).

FIG. 1 shows a block diagram of one implementation of a network environment 100 for linking network accounts. The network environment 100 includes a server 105, a first user system 110, a second user system 115, and a network 120. The server 105, the first user system 110, and the second user system 120 are interconnected by the network 120.

The server 105 is a computer system including processing and storage for providing services to users at connected user systems and managing the network accounts of users. The server 105 provides the online environment for users. Some or all of the resources and services provided by the server 105 are restricted. The server 105 controls access to these restricted resources and services so that only accounts with current proper access levels are permitted to access restricted resources or services. The server 105 creates and manages accounts for users. In one implementation, the server 105 is connected to and maintains an account database 125 storing account information (e.g., information identifying the user for the account, the type of account, the current access level of the account, the permanent or default access level of the account, and the current user system for the account). The server 105 creates and manages subscription information for users, such as in local storage or in the account database 125. Alternatively, the server 105 has access to subscription information through the network 120. The subscription information indicates permissions for the user, including what types of network accounts the user is permitted to create. The server 105 also manages linking accounts and sharing access privileges among linked accounts.

The first user system 110 and the second user system 115 are also computer systems, such as network-capable game consoles. The user systems 110, 115 include processing and storage to interact with each other and the server 105 in accessing online services provided by the server 105. In addition, the user systems 110, 115 store identification information for the users (e.g., a name and password input by the users to the user systems 110, 115). In FIG. 1, the identification information of the first user is indicated by the label "ID1" on the first user system 110. The identification information of the second user is indicated by the label "ID2" on the second user system 115. In another implementation, the identification information identifies a user system, in addition to or instead of a user. The user systems 110, 115 provide the identification information to the server 105 so that the server 105 uses the correct account for each user system 110, 115.

The network 120 is an intermediary network (e.g., the Internet) providing paths for data transmission among the server 105, the first user system 110, and the second user system 115. In an alternative implementation, some or all of the server 105, the first user system 110, and the second user system 120 are directly connected, and so the intermediary network is not always used or is omitted.

In FIG. 1, the first user system 110 has an account with the server that is a member account. The account of the first user system 110 is indicated by the label on the account database 125 showing that identification information ID1 corresponds to the account ACCOUNT1 and that the account ACCOUNT1 has an access level of MEMBER. The second user system 115 has an account with the server that is a non-member account. The account of the second user system 115 is indicated by the label on the account database 125 showing that identification information ID2 corresponds to the account ACCOUNT2 and that the account ACCOUNT2 has an access level of NON-MEMBER. If the account for the second user system 115 is linked to the first user system 110, as described below, the server 105 updates the account database 125 to indicate the link and any changes in access levels for the accounts.

In one implementation, a network account is one of two types: a member account or a non-member account. Each type of account provides a different level of access. A member account provides member access and a non-member account provides non-member or general access. In one implementation, member access includes general access. In another implementation, a member account provides both member access and general access. A member account requires that the user have an appropriate subscription. The user establishes a subscription by paying a fee to the online environment provider (e.g., a one-time or monthly fee). In another implementation, the member account has one or more additional requirements, such as the completion of specified goals in the online environment. Alternatively, these additional requirements replace the subscription requirement. A non-member account does not require a subscription. Alternatively, the non-member account requires a less expensive subscription than the member account.

The level of access for an account determines the privileges available to the user of the account. Some resources or services provided by a server are restricted to accounts that have the proper level of access. For example, participating in an online game or accessing a particular web site or page can be restricted to accounts having member access. Some other resources or services can be unrestricted so that any account can be permitted access. For example, a general chat room service can be unrestricted, while a members chat room is restricted to accounts having member access.

In various implementations, a wide variety of privileges for higher levels of access can be granted. Examples of what member access allows a user to do in various implementations include, but are not limited to (e.g., where member access provides one or more of these privileges):

participating in an online game;
    initiating an online game;
    participating in an online game limited to member accounts;

using special resources while playing an online game, such as accessing special game areas (e.g., entering special buildings in a game) or special game resources (e.g., using special tools in a game or hearing special background music), or using special game functions (e.g., using special moves or techniques in a fighting game);

using special indicators in a game to indicate the level of access available to the account (e.g., the user's character or team has a special uniform or symbol visible in the game);

storing data in the online environment, such as a personal web page, high scores, or saved game data;

reading and posting messages on an online forum or bulletin board;

receiving or accessing a newsletter;

accessing restricted web resources (e.g., a members area collection of web pages);

starting a group or clan in the online environment for other users to join;

joining a restricted group or clan in the online environment;

receiving a discount or coupons for merchandise, services, or subscriptions purchased through the online environment or through an affiliated source; and accepting a link invitation to allow a non-member account to link to the member account.

In another implementation, the online environment supports more than two types of accounts and more than two levels or types of access. In this case, different or overlapping sets of privileges are available for some or all of the account types and the different levels of access. Similarly, different types of accounts may have different requirements to create, such as different types of subscriptions with different fees. In another implementation, a user can add privileges to an account by updating the user's subscription (without changing the type of account).

Figure 2:
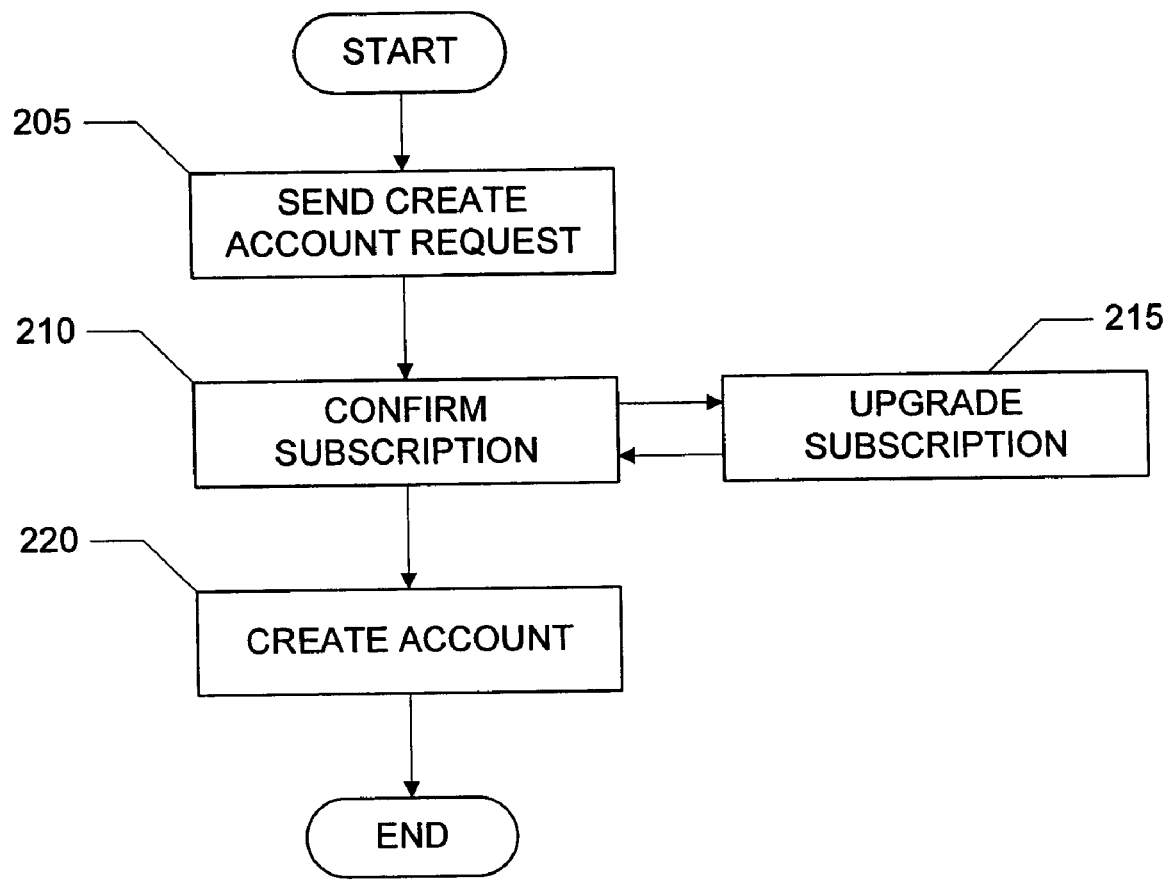
FIG. 2 shows a flowchart of one implementation of creating a network account.

FIG. 2 shows a flowchart 200 of one implementation of creating a network account. Initially, the user has connected a user system to the server and provided identification information to the user system. The user may or may not have previously established a subscription for the online environment.

The user system sends a create account request to the server, block 205. The user causes the user system to send the request. The create account request indicates the user's identification information and a type of account to create. In one implementation, the create account request also indicates subscription information for the user.

The server checks the subscription information for the user to confirm that the subscription of the user permits the user to have the type of account requested, block 210. The server accesses local or remote subscription information for the user. In one implementation, the server uses the identification information to access subscription information stored by the server (e.g., in a subscription database). The subscription information indicates permissions for the user, including what types of network accounts the user is permitted to create.

As described above, one or more account types are restricted and require a certain level of subscription to permit creation. Similarly, one or more account types are unrestricted and do not require a subscription to create. When a user requests a restricted account type, the server compares the permissions of the subscription information with the requested account type to determine if the account is permitted to be created. If the account type is not permitted, the server proceeds to block 215 to offer to update the user's subscription. If the account type is permitted, the server proceeds to block 220 to create the account. If the user does not have a subscription at all and has requested a restricted account type, the server proceeds to block 215. When a user requests an unrestricted account type, the server does not need to check the subscription information for the user and can proceed directly to block 220.

When a user is not permitted to create the requested account type, the server offers the user an upgrade in subscription, block 215. The server offers to upgrade the user's subscription to the appropriate level to permit the creation of the requested account type. Alternatively, the server offers multiple subscription levels to the user. The server indicates to the user the cost or requirements for upgrading the subscription. If the user declines to upgrade, the server terminates the account creation process without creating an account. If the user accepts the upgrade, the server handles the transaction to meet whatever cost or requirements are needed for the upgrade (e.g., processing an online credit card payment). After completing the transaction, the server returns to block 210 to confirm the new subscription. Alternatively, the server confirms the upgraded subscription permits the requested account type as part of the upgrade transaction and so proceeds directly to block 220.

After confirming that the user's subscription permits the creation of an account of the requested account type, the server creates a new account for the user, block 220. The server creates the new account and stores the account information in the account database. The account information indicates the user's identification information, the type of account, and the current level of access.

A user can also upgrade the user's account by sending an upgrade account request to the server, indicating the desired account type. The server handles the upgrade account request similarly to the create account request: confirming that the requested account type or privilege is permitted by the user's subscription, upgrading the subscription if necessary and approved, and upgrading the account if permitted.

In one implementation, one or more types of accounts have requirements related to the online game environment, in addition to (or instead of) a particular subscription level or fee. These online environment requirements indicate accomplishments achieved in the online environment, such as a minimum number of hours or games played, a minimum high score, a minimum number of victories, or a completed action or event within a game (e.g., defeating a particular game opponent or finding a particular game item). When a user has completed one of these achievements, the server offers to upgrade the user's account, if any additional requirements (e.g., payment) are met.

Figure 3:
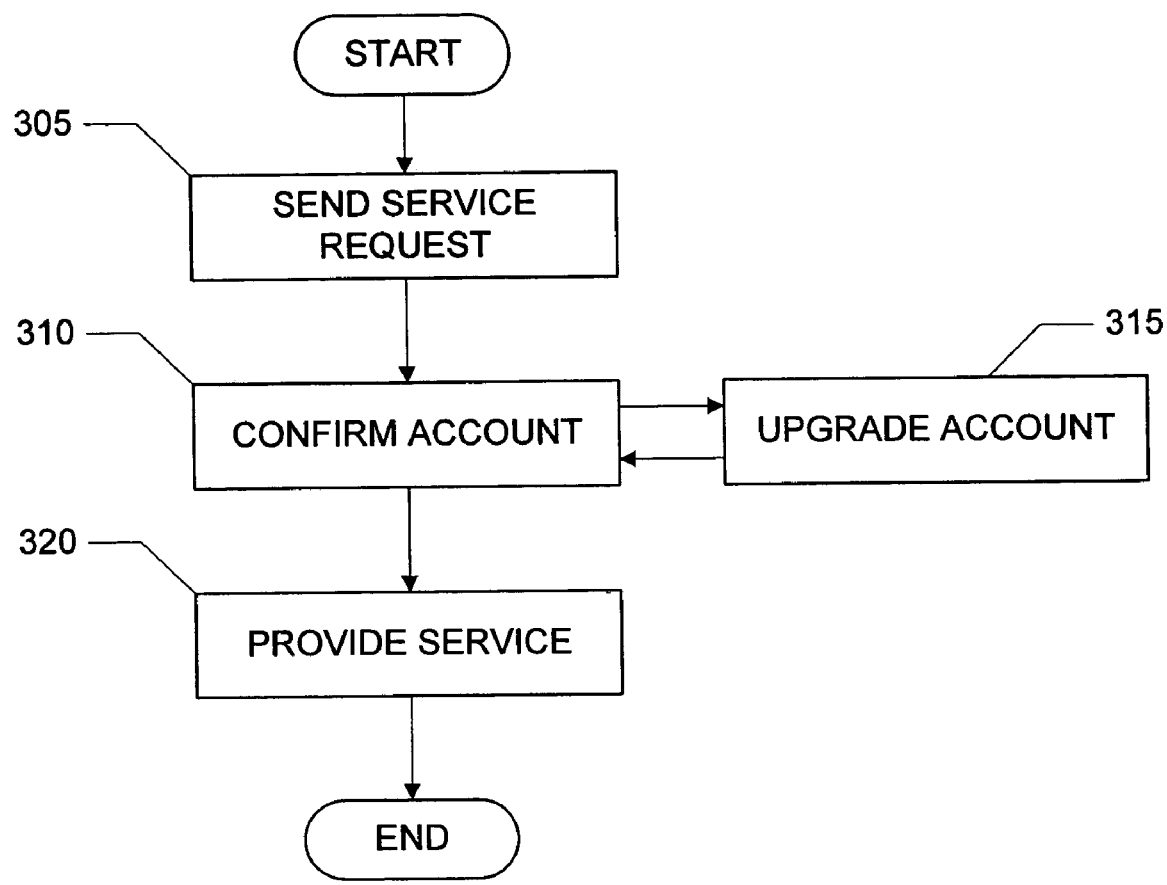
FIG. 3 shows a flowchart of one implementation of providing a service in the online environment to a user.

FIG. 3 shows a flowchart 300 of one implementation of providing a service in the online environment to a user. Initially, a user has created a network account. The user has connected a user system to the server and provided identification information to the user system. The user may or may not have previously established a subscription for the online environment.

The user system sends a service request to the server, block 305. The user causes the user system to send the request. In some situations, the user system or server may create multiple service requests from a single request by a user. The service request indicates the user's identification information and a type of service. In one implementation, the service request also indicates subscription information for the user.

The server checks the user's account information to confirm that the access level of the user's account permits the user to receive the service requested, block 310. The server accesses the account information stored in the account database. As described above, the account information indicates a current access level for the account.

One or more types of services are restricted and require a certain access level. Similarly, one or more types of services are unrestricted and do not require any particular access level. When a user requests a restricted service, the server compares the access level of the user's account with the required access level of the requested service. If the user's access level is insufficient (i.e., the user's access level does not meet or exceed the required access level), the server proceeds to block 315 to offer to upgrade the user's account. If the user's access level is sufficient, the server proceeds to block 320 to provide the service. When a user requests an unrestricted service, the server does not need to check the user's access level and can proceed directly to block 320.

When a user's account does not have the necessary account level for the requested service, the server offers the user an upgrade in account type, block 315. The server offers to upgrade the user's account to the appropriate account type to have the access level needed for the requested service. Alternatively, the server offers multiple account types to the user. In another implementation, the server also offers a temporary increase in access level for a limited number of uses (e.g., one) without changing the account type. The server indicates to the user the cost or requirements for upgrading the account. If the user declines to upgrade, the server terminates the service process without providing the requested service. If the user accepts the upgrade, the server handles the transaction to meet whatever cost or requirements are needed for the upgrade (e.g., processing an online credit card payment). After completing the transaction, the server returns to block 310 to confirm the new account for the requested service. Alternatively, the server confirms the upgraded account has the account level needed for the requested service as part of the upgrade transaction and so proceeds directly to block 320.

After confirming that the user's account has the access level required for the requested service, the server provides the requested service, block 320. The server provides the service in the online environment or causes a remote system to provide the service.

The server handles a request from a user system for access to a resource in a similar way.

In an alternative implementation, when the user's does not have the required access level for the requested service, instead of offering to upgrade the user's account (or as an additional option), the server offers to find another user's account for linking. As described below, when an account is linked to another account, the account with the lower access level temporarily receives the higher access level of the other account. The server can provide a matching service to bring a user requesting a service that is beyond the user's access level to another user that has the appropriate access level. If the user accepts the server's offer, the server sends a link invitation for the user, as described below, and if the link is successful, the server returns to block 315 to confirm the adjusted access level of the user's account. If the user declines the server's offer, the server terminates the service process without providing the requested service.

Figure 4:
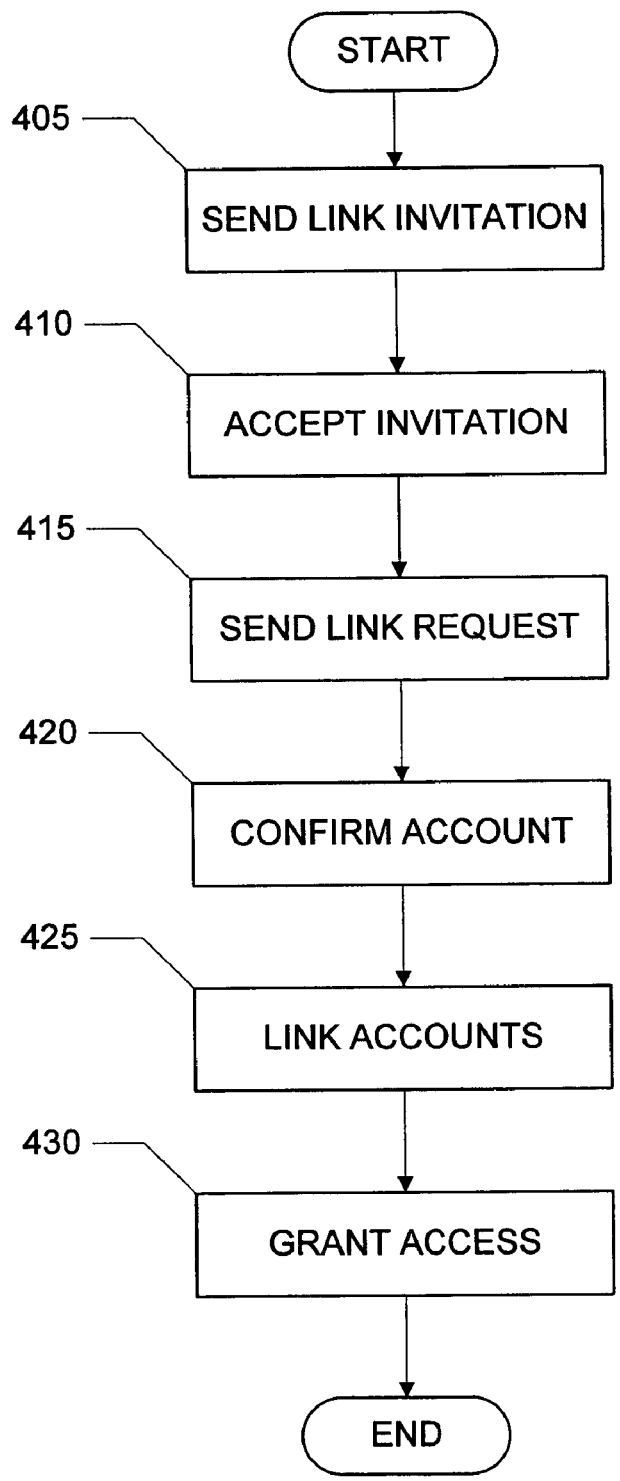
FIG. 4 shows a flowchart of one implementation of a link process for linking a non-member account to a member account.

FIG. 4 shows a flowchart 400 of one implementation of a link process for linking a non-member account to a member account. Initially, a first user has connected a first user system to the server and provided identification information to the first user system. The first user has created a member account having member access in the online environment. A second user has connected a second user system to the server and provided identification information to the second user system. The second user has created a non-member account having non-member access. In the description of FIG. 4, the second user will be linking the second user's account to the account of the first user. In this case, the first user's account is the "linked account" and the second user's account is the "linking account" (the users and user systems can also be referred to as linked and linking).

The second user system sends a link invitation to the first user system, block 405. The second user causes the second user system to send the request. The link invitation indicates the first user as the intended recipient and indicates the account of the second user as the linking account. The link invitation is a request to the first user to allow the account of the second user to be linked to the account of the first user. The second user system sends the link invitation to the first user system through the server. Alternatively, the second user system has appropriate information to send the link invitation to the first user system directly (without using the server) and does so. In one implementation, the link invitation is sent as a challenge to play a game.

In another implementation, a user system sends a link invitation indicating the user's identification information and a target user to the server. The server retrieves the user's account information and adds the account information to the link invitation. The server then sends the updated link invitation to the user system of the target user.

As noted above, the second user system sends the link invitation at the request of the second user. In another implementation, the server sends a link invitation on behalf of a user, such as when the user requests a service for which the user's account does not have an appropriate access level. In another implementation, the server sends the link invitation to the second user system on behalf of the first user system, such as when the user of the first user system wants to invite the user of the second user system to join a game.

The first user system sends an invitation acceptance to the second user system, block 410. The first user decides whether to accept the link invitation. If the first user decides not to accept the link invitation, the first user system sends a decline message to the server and the link process ends. Alternatively, the first user system does not respond and ignores the link invitation to decline the invitation. If the first user accepts the link invitation, the first user system sends the invitation acceptance to the second user system through the server. The invitation acceptance confirms that the first user system will request that the server set up a link between the two accounts. In another implementation, the first user system has appropriate information to send the invitation acceptance to the second user system directly (without using the server) and does so.

The first user system sends a link request to the server, block 415. The link request indicates the first user's account and the second user's account. In another implementation, the link request indicates identification information for the first user and the second user and the server retrieves appropriate account information.

The server confirms the accounts permit the second user's account to be linked to the first user's account, block 420. The server retrieves appropriate account information (and subscription information or other information if needed) to confirm that the first user's account is permitted to accept links from other accounts and that the second user's account is permitted to link to other accounts. For example, the server may place restrictions on creating links between accounts for misuse of accounts or to limit network traffic under certain conditions. In one implementation, an account is permitted to link to only one account at a time or be linked to only account at a time. If the server determines that the link between the accounts is permitted, the server proceeds to block 425 to create the link. If the server determines that that link is not permitted, the server ends the link process without creating a link. In another implementation, if the link is not permitted and upgrading one or both of the accounts or subscriptions would permit the link, the server offers an appropriate upgrade (similar to offering to upgrade a subscription or account, as described above).

After confirming the accounts permit the link to be created, the server links the second user's account to the first user's account, block 425. The server updates the account information for the second user's account to indicate that the second user's account is linked to the first user's account. The server also updates the account information for the first user's account to indicate that the second user's account is linked to the first user's account. In another implementation, the link is "one-way" and so the server does not update the account information for the first user's account.

After linking the accounts, the server grants the access level of the first user's account to the second user's account, block 430. The first user's account is a member account and has member access. The second user's account is a non-member account and has non-member or general access. The server updates the second user's account information to indicate that the current access level has been changed to member access. As described above, when a user requests a service from the server, the server checks the current level of access for the user's account and so the effect of a link will be reflected in the server's decision of whether to provide a service to a user or not. The server preserves the original or default level of access for the second user's account. As described below, when the link terminates, the server updates the account information for the second user's account to indicate that the current level of access is once again at the original access level of non-member access. At this time, the accounts are now linked.

In another implementation, an account can be linked to multiple accounts. In this case, when an account is linked to another account, the server records in the linking account's account information which privileges or access level is granted from which linked account. When a link is terminated, the server only removes the privileges or access level that was granted by the terminated link.

Figure 5:
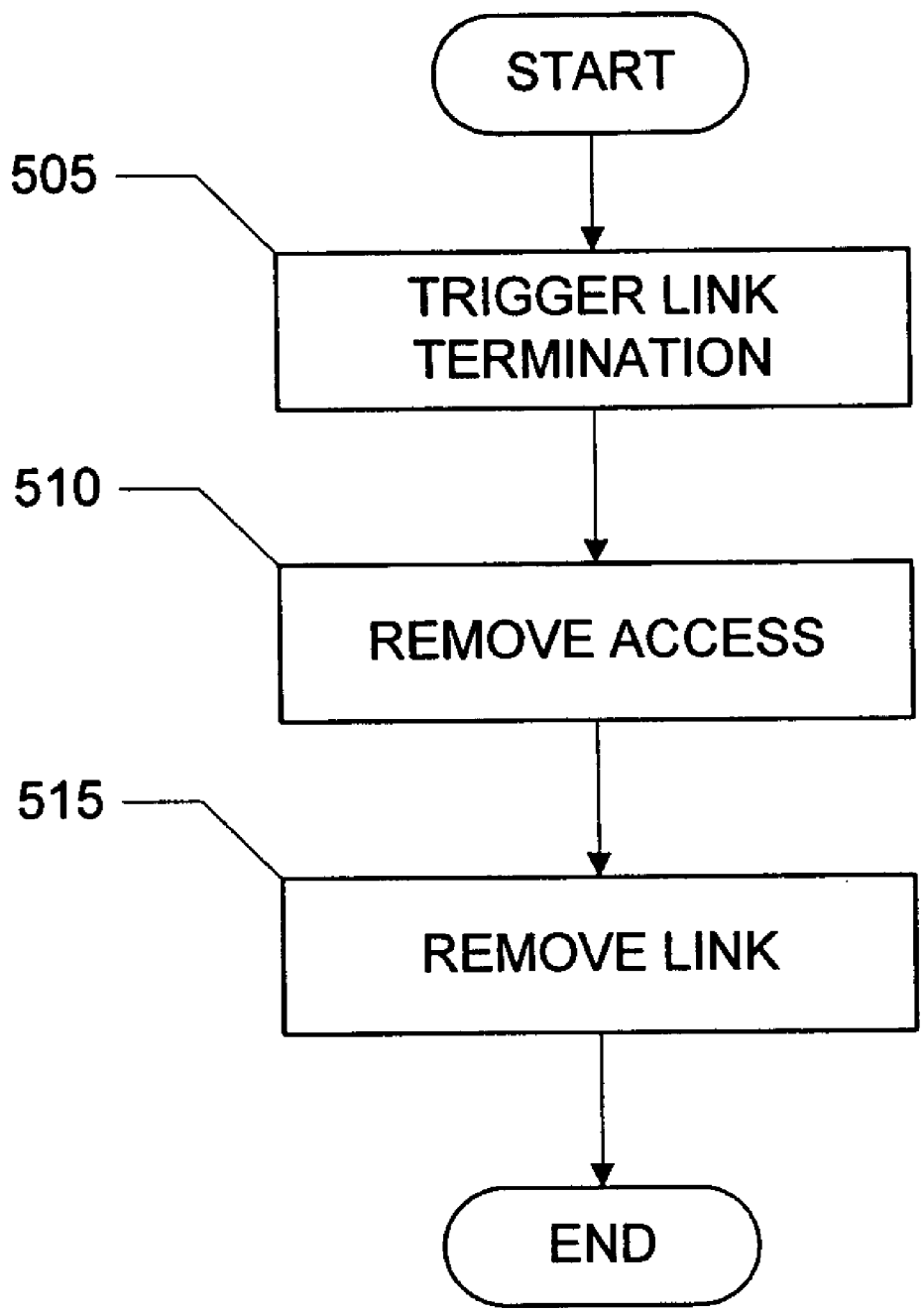
FIG. 5 shows a flowchart of one implementation of unlinking two linked accounts.

FIG. 5 shows a flowchart of one implementation of unlinking two linked accounts. Initially, a second user's account is linked to a first user's account, such as after the conclusion of the link process described above referring to FIG. 4.

An event triggers the termination of the link, block 505. The triggering event can be a request from either of the users of the linked accounts or an event that causes the server to determine the link is to be terminated. The server has one or more rules which trigger the termination of links. For example, if one of the users misuses an account, the server may decide to terminate the link. In another example, when either of the user systems disconnects from the server, the server terminates the link.

The server removes the access level granted to the second user's account by the link, block 510. The server updates the account information for the second user's account to indicate that the current level of access is once again at the original access level.

The server removes the link from the accounts, block 515. The server updates the account information for both of the accounts to indicate that the link has been removed. At this time, the accounts are no longer linked.

In one implementation described above, when one account (the linking account) is linked to another account (the linked account), the linking account receives the access level of the linked account while the accounts are linked. This type of link is a direct link. However, in other implementations, various types of links between accounts are available in addition to or instead of direct links. In one implementation, the user of the linking account requests a particular type of link in the link invitation. In another implementation, the user of the linked account accepts or specifies a particular type of link in the link acceptance. In another implementation, the server selects the type of link based on the context (e.g., one type of link is used for online game tournaments and another type of link is used for general use in the online environment).

In one implementation, a server provides limited time links. In a limited time link, the server terminates the link when a specific time period has elapsed since the establishment of the link (e.g., one day), or a specific time has been reached (e.g., the end of the day when the link was established).

In another implementation, a server provides persistent links. In a persistent link, the link does not terminate until one of the users of the linking or linked accounts requests the termination. The persistent link does not terminate when either or both of the user systems disconnects. The persistent link is still in effect when a user returns to the online environment, even using a different user system than when the link was established.

In another implementation, a server provides limited use links. In a limited use link, after a set number of services have been requested through the linking account after establishing the link, the server terminates the link. For example, one limited use link allows only one use. In one implementation, different services consume different numbers of available services from the limited use number. For example, some services are "free" and do not use up available services while some other services are "expensive" and use up more than one available service (e.g., counting as two uses of services).

In another implementation, a server provides limited purpose links. In a limited purpose link, the linking account receives the access level of the linked account for one or more specific services. For example, the linking account has the higher access level only for playing one particular online game.

In another implementation, a server provides partial links. In a partial link, the linked account has multiple levels of access and linking account does not receive all the levels of access of the linked account. For example, in one implementation, an account can have access levels A, B, C, and/or D. Each level provides different privileges. The linking account has access level A. The linked account has access levels A, B, and C. When the user of the linked account accepts the link invitation, the user of the linked account specifies that the link is to be a partial link granting access level B only. As a result, the linking account will have access levels A and B, but not C, while the link exists. In another example, a member account has a member access level and a members-only access level. The members-only access level is restricted to accounts that have appropriate subscriptions and the members-only access level is not permitted to be granted to an account through a link. As a result, the linking account to a member account will receive the member access level but will not receive the restricted members-only access level (assuming the linking account lacks the appropriate subscription).

In another implementation, a server provides loan links. In a loan link, the linked account transfers the linked account's level of access to the linking account while the link exists. As a result, the linked account no longer has that level of access and is disabled or has a reduced level of access. In one implementation, the accounts exchange their levels of access.

In another implementation, a server provides membership links. For a membership link, the server creates a group for a leader account and the server automatically links any accounts belonging to the group to the leader account. As a result, all of the accounts belonging to the group will have the access level of the leader account.

In another implementation, a server provides pool links. For a pool link, the server maintains a pool and an associated group of pool accounts that are authorized to access the pool. A pool account can contribute a link to the pool. A pool account can link to the pool to receive a contributed link (rather than linking to a specific account). For example, the server provides a pool for a clan of accounts. Each clan member can access the pool. A number of clan members with higher levels of access provide their access levels to the pool and so the same number of clan members with lower access levels can link to the pool and receive the higher access level. The pool links allow the pool accounts to share the access levels more freely without requiring a one-to-one relationship be established by the users.

In another implementation, a server provides one or more types of links that are combinations of the types of links described above. For example, a server provides limited time limited purpose links. In addition, the types of links described above are illustrative and other types of links are possible as well.

In an alternative implementation, the server does not link accounts but instead links accounts to privileges. In this case, an account has one more privileges (e.g., created as separate data objects from the account). A user or an account can make a privilege of the account available for sharing or linking. Another user can link that user's account to the privilege that the first user has made available. For example, an account includes one or more references to privileges. For privileges owned by or attributed to the account, the references indicate privilege objects. An account can make a privilege available to be linked to by indicating the privilege is available for sharing. When a linking account is linked to a shared privilege of a "donor" account, the linking account stores a reference to the shared privilege. As a result, the shared privilege can have multiple references indicating the privilege (e.g., the owning account and one or more linking accounts).

The various implementations of the invention are realized in electronic hardware, computer software, or combinations of these technologies. Some implementations include one or more computer programs executed by a programmable processor or computer. For example, referring to FIG. 1, in one implementation, the server and the user systems include one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations providing an online environment for playing games, the online environment can provide different or additional services as well, such as chatting or publishing and sharing data (e.g., text, pictures, audio, video, or multimedia).

Accordingly, the present invention is not limited to only those implementations described above.

What is claimed is:

1. A method of managing network accounts, comprising:
    providing a first account with member access allowing two or more privileges in the network;
    providing a second account with general access,
    wherein general access comprises:
        at least one privilege in the network that member access allows; and
        at least one privilege less than the member access allows;
    linking the second account having general access to the first account having member access; and
    granting at least one privilege of said member access of the first account to said second account while said second account is linked to said first account,
    wherein when the first account disconnects from the network, the link between the first account and the second account is terminated and the granted at least one privilege to the second account is removed from the second account,
    wherein after a predetermined number of services is requested through the link between the first account and the second account, the link between the first account and the second account is terminated,
    wherein a service request includes identification information of the second user, subscription information of the second user, and a type of a requested service,
    wherein a second account is permitted to be linked to only one first account at a time,
    wherein, when the second account and the first account are not linked, the second account reverts back to previous general access.

2. The method of claim 1, wherein:
    said subscription has a higher cost than a cost needed to be eligible for an account having general access.

3. The method of claim 1, wherein:
    said member access privileges include allowing an account to participate in an online game.

4. The method of claim 1, wherein:
    said member access privileges include allowing an account to initiate an online game.

5. The method of claim 1, wherein:
    said member access privileges include allowing an account to access a restricted online resource.

6. The method of claim 1, wherein:
    said member access privileges include allowing an account to participate in an online game in a way that indicates the account has member access.

7. The method of claim 6, wherein:
    said member access privileges include allowing an account to participate in an online game with a visual cue indicating the account has member access.

8. The method of claim 1, wherein:
    said member access privileges include allowing an account to participate in an online game in a way that is different from a way an account without this privilege of member access participates.

9. The method of claim 8, wherein:
said member access privileges include allowing an account to access one or more special resources in an online game that are not available to an account without member access.

10. The method of claim 8, wherein:
said member access privileges include allowing an account to access one or more special features in an online game that are not available to an account without this privilege of member access.

11. The method of claim 1, wherein:
said first account also has members-only access, and
said members-only access provides one or more privileges different from said two or more privileges provided by said member access and from said at least one privilege provided by said general access.

12. The method of claim 11, wherein:
said second account does not have members-only access when said second account is linked to said first account.

13. The method of claim 1, wherein:
said first account also has said general access.

14. The method of claim 1, further comprising:
receiving a create member account request indicating said subscription;
confirming said subscription allows creating a member account; and
creating said first account.

15. The method of claim 14, further comprising:
upgrading said subscription to allow creating a member account.

16. The method of claim 1, further comprising:
receiving a create non-member account request; and
creating said second account.

17. The method of claim 1, further comprising:
receiving a link request indicating said first account and said second account; and
confirming said first account allows linking.

18. The method of claim 17, further comprising:
confirming said second account allows linking.

19. The method of claim 1, further comprising:
receiving an unlink request indicating said first account and said second account;
revoking said granted at least part of said member access from said second account; and
unlinking said second account from said first account.

20. The method of claim 1, further comprising:
receiving a service request indicating a service having a minimum access and an account;
confirming said requesting account currently has access meeting said minimum access of said indicated service; and
providing said service.

21. The method of claim 20, further comprising:
upgrading said requesting account to have access meeting said minimum access of said indicated service.

22. The method of claim 1, wherein:
granting said at least part of said member access includes granting less than all of said two or more privileges of said member access to said second account.

23. The method of claim 1, wherein:
granting said at least part of said member access includes granting at least one of said two or more privileges of said member access to said second account for a limited period of time.

24. The method of claim 1, further comprising:
removing said member access from said first account while said second account is linked to said first account.

25. The method of claim 1, wherein:
said second account is linked to said first account indirectly through an intermediary data object.

26. The method of claim 25, wherein:
said intermediary data object is a pool.

27. A method of managing network accounts, comprising:
creating a first account having general access;
communicating with a second account having member access,
wherein general access allows:
  at least one privilege in the network that member access allows; and
  at least one privilege less than the member access allows;
receiving an upgrade request requesting an upgrade of the first account having general access to include the at least one privilege of the member access of the second member;
confirming said first account is permitted to be upgraded based on said first account meeting one or more requirements for having member access, including being linked to an account having member access;
upgrading said first account to have member access,
wherein when the second account disconnects from the network, the link between the first account and the second account is terminated and the upgrade of the first account is removed from the first account,
wherein after a predetermined number of services is requested through the link between the first account and the second account, the link between the first account and the second account is terminated,
wherein a service request includes identification information of the first user, subscription information of the first user, and a type of a requested service,
wherein a second account is permitted to be linked to only one first account at a time;
reverting said first account back to general access when said first account is no longer linked to at least one account having member access.

28. A method of linking network accounts, comprising:
creating a first account having member access;
sending a link invitation indicating a second account having general access,
wherein general access allows:
  at least one privilege in the network that member access allows; and
  at least one privilege less than the member access allows;
receiving a link acceptance indicating said first account will be linked to said second account;
sending a service request indicating a service having a minimum access requiring member access;
accessing said service by said second account such that said second account has member access of the first account while linked to the first account,
wherein when the first account disconnects from the network, the link between the first account and the second account is terminated and the member access of the second account is removed from the second account,
wherein after a predetermined number of services is requested through the link between the first account and the second account, the link between the first account and the second account is terminated,
wherein a service request includes identification information of the second user, subscription information of the second user, and a type of a requested service,
wherein a second account is permitted to be linked to only one first account at a time; and reverting said second account to general access when the first account and said second account are not linked.

29. A method of linking network accounts, comprising:
creating a first account having member access;
communicating with a second account having general access,
   wherein general access comprises:
      at least one privilege in the network that member access allows; and
      at least one privilege less than the member access allows;
receiving a link invitation from the second account having general access;
sending a link request indicating said second account is to be linked to said first account;
allowing the second account access to the at least one privilege of the member access of the first account,
wherein when the first account disconnects from the network, the link between the first account and the second account is terminated and the at least one privilege of the member access of the second account is removed from the second account,
wherein a second account is permitted to be linked to only one first account at a time;
wherein after a predetermined number of services is requested through the link between the first account and the second account, the link between the first account and the second account is terminated,
wherein a service request includes identification information of the second user, subscription information of the second user, and a type of a requested service,
reverting said second account to general access when the first account and said second account are not linked.

30. A computer program, stored on a tangible storage medium, for use in managing network accounts, the program comprising executable instructions that cause a computer to:
providing a first account with member access allowing two or more privileges;
providing a second account with general access;
   wherein general access comprises:
      at least one privilege in the network that member access allows; and
      at least one privilege less than the member access allows;
link a second account having general access to a first account having member access;
grant at least one privilege of said member access of the first account to said second account while said second account is linked to said first account,
wherein when the first account disconnects from the network, the link between the first account and the second account is terminated and the granted at least one privilege to the second account is removed from the second account,
wherein after a predetermined number of services is requested through the link between the first account and the second account, the link between the first account and the second account is terminated,
wherein a service request includes identification information of the second user, subscription information of the second user, and a type of a requested service,
wherein a second account is permitted to be linked to only one first account at a time; and
reverting the grant to said second account when said second account and said first account are not linked.

31. The computer program of claim 30, wherein:
said subscription has a higher cost than a cost needed to be eligible for an account having general access.

32. The computer program of claim 30, wherein:
said member access privileges include allowing an account to participate in an online game.

33. The computer program of claim 30, wherein:
said member access privileges include allowing an account to initiate an online game.

34. The computer program of claim 30, wherein:
said member access privileges include allowing an account to access a restricted online resource.

35. The computer program of claim 30, wherein:
said member access privileges include allowing an account to participate in an online game in a way that indicates the account has member access.

36. The computer program of claim 35, wherein:
said member access privileges include allowing an account to participate in an online game with a visual cue indicating the account has member access.

37. The computer program of claim 30, wherein:
said member access privileges include allowing an account to participate in an online game in a way that is different from a way an account without this privilege of member access participates.

38. The computer program of claim 37, wherein:
said member access privileges include allowing an account to access one or more special resources in an online game that are not available to an account without member access.

39. The computer program of claim 37, wherein:
said member access privileges include allowing an account to access one or more special features in an online game that are not available to an account without this privilege of member access.

40. The computer program of claim 30, wherein:
said first account also has members-only access, and
said members-only access provides one or more privileges different from said two or more privileges provided by said member access and from said at least one privilege provided by said general access.

41. The computer program of claim 40, wherein:
said second account does not have members-only access when said second account is linked to said first account.

42. The computer program of claim 30, wherein:
said first account also has said general access.

43. The computer program of claim 30, further comprising executable instructions that cause a computer to:
process a create member account request indicating said subscription;
confirm said subscription allows creating a member account; and
create said first account.

44. The computer program of claim 43, further comprising executable instructions that cause a computer to:
upgrade said subscription to allow creating a member account.

45. The computer program of claim 30, further comprising executable instructions that cause a computer to:
process a create non-member account request; and
create said second account.

46. The computer program of claim 30, further comprising executable instructions that cause a computer to:
process a link request indicating said first account and said second account; and
confirm said first account allows linking.

47. The computer program of claim 46, further comprising executable instructions that cause a computer to:
confirm said second account allows linking.

48. The computer program of claim 30, further comprising executable instructions that cause a computer to:
process an unlink request indicating said first account and said second account;
revoke said granted at least part of said member access from said second account; and
unlink said second account from said first account.

49. The computer program of claim 30, further comprising executable instructions that cause a computer to:
process a service request indicating a service having a minimum access and an account;
confirm said requesting account currently has access meeting said minimum access of said indicated service; and
provide said service.

50. The computer program of claim 49, further comprising executable instructions that cause a computer to:
upgrade said requesting account to have access meeting said minimum access of said indicated service.

51. The computer program of claim 30, wherein:
granting said at least part of said member access includes granting less than all of said two or more privileges of said member access to said second account.

52. The computer program of claim 30, wherein:
granting said at least part of said member access includes granting at least one of said two or more privileges of said member access to said second account for a limited period of time.

53. The computer program of claim 30, further comprising executable instructions that cause a computer to:
remove said member access from said first account while said second account is linked to said first account.

54. The computer program of claim 30, wherein:
said second account is linked to said first account indirectly through an intermediary data object.

55. The computer program of claim 54, wherein:
said intermediary data object is a pool.

56. A computer program, stored on a tangible storage medium, for use in managing network accounts, the program comprising executable instructions that cause a computer to:
create a first account having member access;
communicate with a second account having general access,
wherein general access allows:
at least one privilege in the network that member access allows; and
at least one privilege less than the member access allows;
process an upgrade request requesting an upgrade of the second account having general access to include the at least one privilege of the member access;
confirm said second account is permitted to be upgraded based on said second account meeting one or more requirements for having member access, including said second account being linked to said first account;
upgrade said second account to have member access of the first account,
wherein when the first account disconnects from the network, the link between the first account and the second account is terminated and the upgrade of the second account is removed from the second account,
wherein after a predetermined number of services is requested through the link between the first account and the second account, the link between the first account and the second account is terminated,
wherein a service request includes identification information of the second user, subscription information of the second user, and a type of a requested service,
wherein a second account is permitted to be linked to only one first account at a time; and
revert said second account to general access when said second account and said first account are not linked.

57. A computer program, stored on a tangible storage medium, for use in linking network accounts, the program comprising executable instructions that cause a computer to:
create a first account having general access;
send a link invitation indicating a second account having member access,
wherein general access allows:
at least one privilege in the network that member access allows; and
at least one privilege less than the member access allows;
process a link acceptance indicating said first account will be linked to said second account;
send a service request indicating a service having a minimum access requiring member access; and
access said member service of the second account by said first account when said first account is linked to said second account,
wherein when the second account disconnects from the network, the link between the first account and the second account is terminated and the member access to the first account is removed from the first account,
wherein after a predetermined number of services is requested through the link between the first account and the second account, the link between the first account and the second account is terminated,
wherein a service request includes identification information of the first user, subscription information of the first user, and a type of a requested service,
wherein a second account is permitted to be linked to only one first account at a time; and
revert said first account to general access when said first account and said second account are not linked.

58. A computer program, stored on a tangible storage medium, for use in linking network accounts, the program comprising executable instructions that cause a computer to:
create a first account having member access,
communicate with a second account, the second account having general access,
wherein general access allows:
at least one privilege in the network that member access allows; and
at least one privilege less than the member access allows;
process a link invitation from the second account having general access;
send a link request indicating said second account is to be linked to said first account;
allowing the second account access to the at least one privilege of the member access of the first account while the second account is linked to the first account,
wherein when the first account disconnects from the network, the link between the first account and the second account is terminated and the at least one privilege to the second account is removed from the second account,
wherein after a predetermined number of services is requested through the link between the first account and the second account, the link between the first account and the second account is terminated,
wherein a service request includes identification information of the second user, subscription information of the second user, and a type of a requested service, wherein a second account is permitted to be linked to only one first account at a time; and reverting the access of the second account to general access when the second account is not linked to the first account.

59. A system for managing network accounts, comprising:

means for linking a second account having general access to a first account having member access, wherein general access allows:
- at least one privilege in the network that member access allows; and
- at least one privilege less than the member access allows; and means for granting at least one privilege of said member access of the first account to said second account while said second account is linked to said first account;

wherein when the first account disconnects from the network, the link between the first account and the second account is terminated and the granted at least one privilege to the second account is removed from the second account, wherein said first account has a corresponding subscription, wherein after a predetermined number of services is requested through the link between the first account and the second account, the link between the first account and the second account is terminated, wherein a service request includes identification information of the second user, subscription information of the second user, and a type of a requested service, wherein a second account is permitted to be linked to only one first account at a time; and means for reverting said second account grant of member access when said second account and said first account are not linked.

* * * * *